United States Patent
Boyce et al.

(10) Patent No.: US 8,542,733 B2
(45) Date of Patent: Sep. 24, 2013

(54) MULTIPASS VIDEO RATE CONTROL TO MATCH SLIDING WINDOW CHANNEL CONSTRAINTS

(75) Inventors: Jill MacDonald Boyce, Manalapan, NJ (US); Daniel Richard Girellini, New Brunswick, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1750 days.

(21) Appl. No.: 10/561,361

(22) PCT Filed: Mar. 1, 2004

(86) PCT No.: PCT/US2004/006071
§ 371 (c)(1),
(2), (4) Date: Dec. 19, 2005

(87) PCT Pub. No.: WO2005/011255
PCT Pub. Date: Feb. 3, 2005

(65) Prior Publication Data
US 2006/0165168 A1    Jul. 27, 2006

Related U.S. Application Data

(60) Provisional application No. 60/482,670, filed on Jun. 26, 2003.

(51) Int. Cl.
*H04N 7/12* (2006.01)
(52) U.S. Cl.
USPC ............ 375/240.12; 375/240.03; 375/240.02; 382/239

(58) Field of Classification Search
USPC ........................................ 375/240.02
See application file for complete search history.

(56) References Cited

U.S. PATENT DOCUMENTS

| | | | |
|---|---|---|---|
| 5,416,521 A | 5/1995 | Chujoh et al. | |
| 5,835,149 A * | 11/1998 | Astle | 375/240.05 |
| 5,870,145 A | 2/1999 | Yada et al. | |
| 5,929,916 A * | 7/1999 | Legall et al. | 375/240.05 |
| 5,978,029 A * | 11/1999 | Boice et al. | 375/240.14 |
| 6,118,817 A * | 9/2000 | Wang | 375/240.03 |
| 6,167,084 A * | 12/2000 | Wang et al. | 375/240.02 |
| 6,192,154 B1 * | 2/2001 | Rajagopalan et al. | 382/232 |
| 6,198,769 B1 | 3/2001 | Mihara | |
| 6,269,078 B1 | 7/2001 | Lakshman et al. | |
| 6,278,735 B1 * | 8/2001 | Mohsenian | 375/240 |
| 6,614,935 B2 * | 9/2003 | Rajagopalan et al. | 382/232 |
| 6,763,067 B2 * | 7/2004 | Hurst | 375/240.03 |

(Continued)

FOREIGN PATENT DOCUMENTS

| | | |
|---|---|---|
| EP | 0239076 | 9/1987 |
| JP | 5336511 | 12/1993 |

(Continued)

*Primary Examiner* — Jayanti K Patel
*Assistant Examiner* — Jessica Prince
(74) *Attorney, Agent, or Firm* — Robert D. Shedd; Jeffrey M. Navon

(57) ABSTRACT

An encoder and corresponding method are disclosed for performing video rate control to meet network traffic model restrictions, including pre-encoding the sequence of pictures for each of a plurality of quantization parameter values, selecting for each picture of the sequence one of the plurality of quantization parameter values responsive to the quantization parameter values and bitrate operating points of the neighboring pictures in the sliding time window, and encoding each picture of the sequence using the quantization parameter value selected for that picture.

21 Claims, 3 Drawing Sheets

(56) References Cited

U.S. PATENT DOCUMENTS

| | | |
|---|---|---|
| 6,801,572 B2 | 10/2004 | Yamada et al. |
| 6,847,656 B1 * | 1/2005 | Wu et al. ................ 370/477 |
| 6,925,120 B2 * | 8/2005 | Zhang et al. ......... 375/240.08 |
| 6,970,506 B2 * | 11/2005 | Kim et al. ............ 375/240.01 |
| 7,016,337 B1 * | 3/2006 | Wu et al. ................ 370/352 |
| 7,072,393 B2 * | 7/2006 | Boice et al. .......... 375/240.01 |
| 7,099,389 B1 * | 8/2006 | Yu et al. ............. 375/240.12 |
| 2002/0120442 A1 | 8/2002 | Hotta |

FOREIGN PATENT DOCUMENTS

| | | |
|---|---|---|
| JP | 07066982 | 3/1995 |
| JP | 2001320712 | 11/2001 |
| JP | 2002051343 | 2/2002 |
| WO | WO9628937 | 9/1996 |

\* cited by examiner

MULTIPASS VIDEO RATE CONTROL TO MATCH SLIDING WINDOW CHANNEL CONSTRAINTS

This application claims the benefit, under 35 U.S.C. §365 of International Application PCT/US04/006071, filed Mar. 1, 2004, which was published in accordance with PCT Article 21(2) on Feb. 3, 2005 in English and which claims the benefit of U.S. provisional patent application No. 60/482,670, filed Jun. 26, 2003.

CROSS-REFERENCE TO RELATED APPLICATION

This application claims the benefit of U.S. Provisional Patent Application Ser. No. 60/482,670, entitled "Multipass Video Rate Control to Match Sliding Window Channel Constraints" and filed Jun. 26, 2003, which is incorporated herein by reference in its entirety.

FIELD OF THE INVENTION

The invention relates to the field of video encoders and decoders (collectively "CODECs"), and in particular, towards CODECs with video rate control.

BACKGROUND OF THE INVENTION

Video data is generally processed and transferred in the form of bit streams. Variable Bit Rate ("VBR") video encoders can achieve better quality video compression than Constant Bit Rate ("CBR") video encoders for the same average bitrate as measured over a relatively long time interval, such as, for example, over an entire program length. VBR encoded video is sometimes called Constant Quality video. This is due to the fact that as the complexity of the video changes throughout the video sequence, variable bit rate encoded video is created to maintain a constant quality. CBR video encoders are typically used to meet the bandwidth requirements of a network traffic model.

VBR video is generally used for applications that do not use fixed bandwidth channels. VBR video may be used for DVDs, for example. Unfortunately, communications networks typically have fixed bandwidth links that are more amenable to CBR video. In CBR video, the encoded bitrate is kept constant, which causes the perceived video quality to vary. This leads to a worse user experience than for VBR video, because the worst case video quality for CBR is generally worse than the constant quality level for VBR, and user perception is greatly influenced by the worse case quality.

SUMMARY OF THE INVENTION

These and other drawbacks and disadvantages of the prior art are addressed by a system and method for performing video rate control for pre-stored video content using multi-pass encoding techniques while not exceeding the restrictions of the network traffic model.

An encoder, decoder, and corresponding method are disclosed for performing video rate control to meet network traffic model restrictions, including pre-encoding a sequence of video pictures for each of a plurality of quantization parameter values, selecting one of the plurality of quantization parameter values for each picture of the video sequence, and encoding each picture of the video sequence using the quantization parameter value selected for that picture.

These and other aspects, features and advantages of the present invention will become apparent from the following description of exemplary embodiments, which is to be read in connection with the accompanying drawings.

BRIEF DESCRIPTION OF THE DRAWINGS

The present invention is a system and method for performing video rate control for pre-stored video content using multi-pass encoding techniques while not exceeding the restrictions of the network traffic model, in accordance with the following exemplary figures, in which.

DETAILED DESCRIPTION OF PREFERRED EMBODIMENTS

Figure 1:
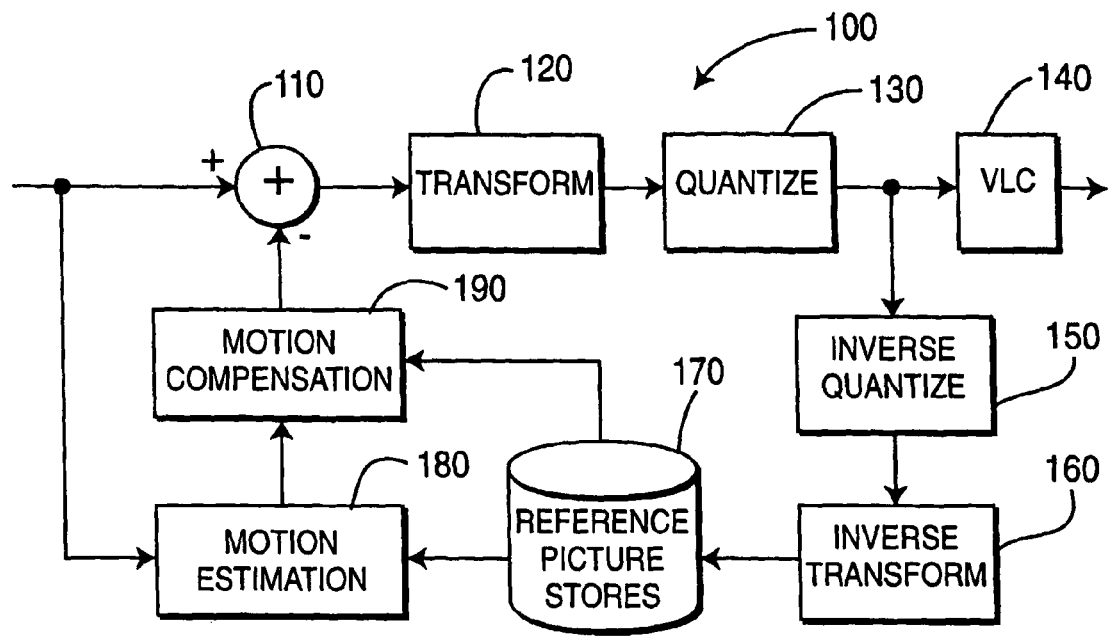
FIG. 1 shows a block diagram for a video encoder with video rate control in accordance with principles of the present invention.

The following description illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams included herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

As shown in FIG. 1, a video encoder is indicated generally by the reference numeral 100. An input to the encoder 100 is connected in signal communication with a non-inverting input of a summing junction 110. The output of the summing junction 110 is connected in signal communication with a transform function block 120. The transformer 120 is connected in signal communication with a quantizer 130. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transform function 160, which, in turn, is connected in signal communication with a reference picture store 170. A first output of the reference picture store 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2A:
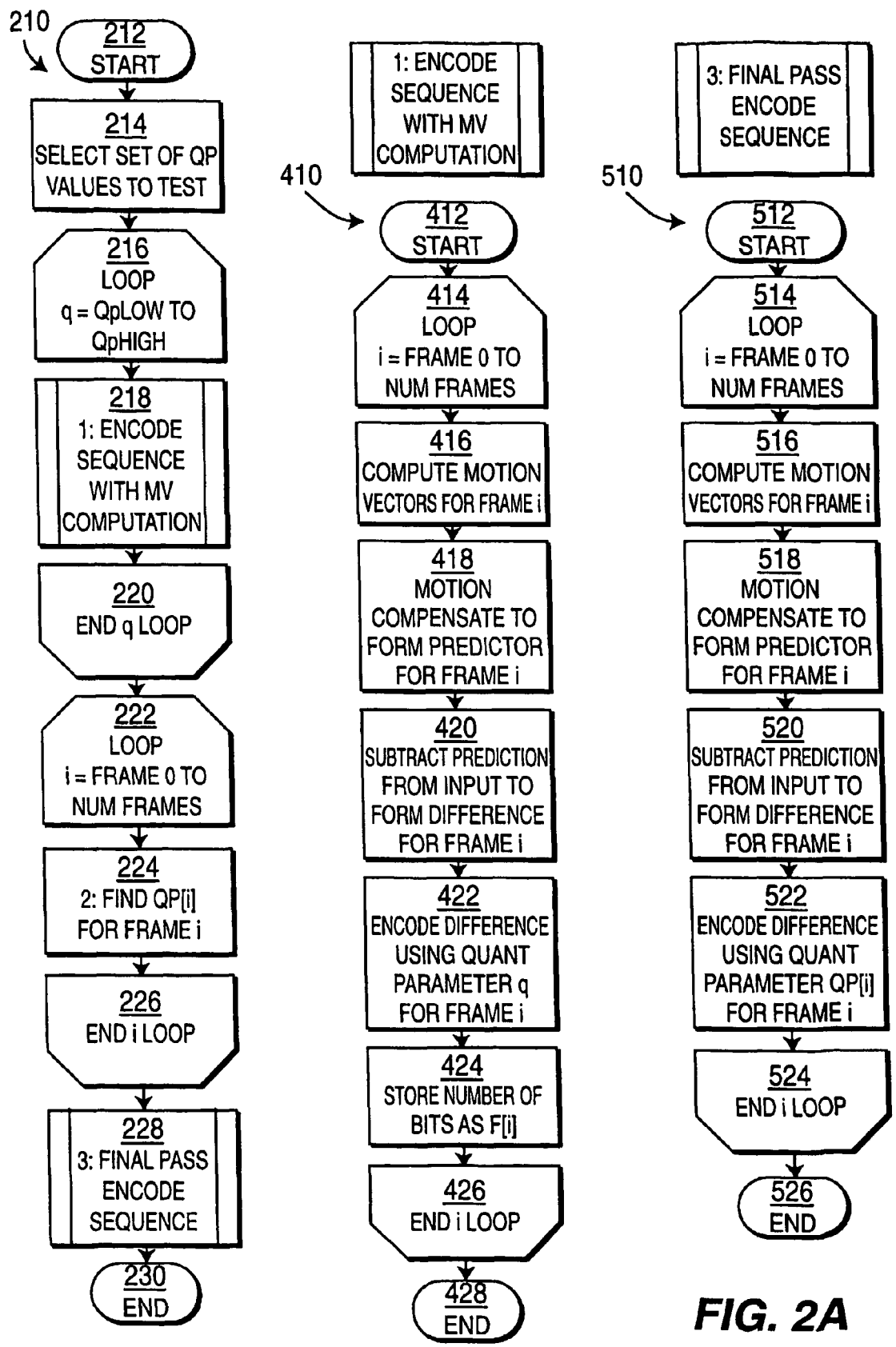
FIGS. 2A and 2B show flowcharts for encoding processes in accordance with the principles of the present invention.
Figure 2B:
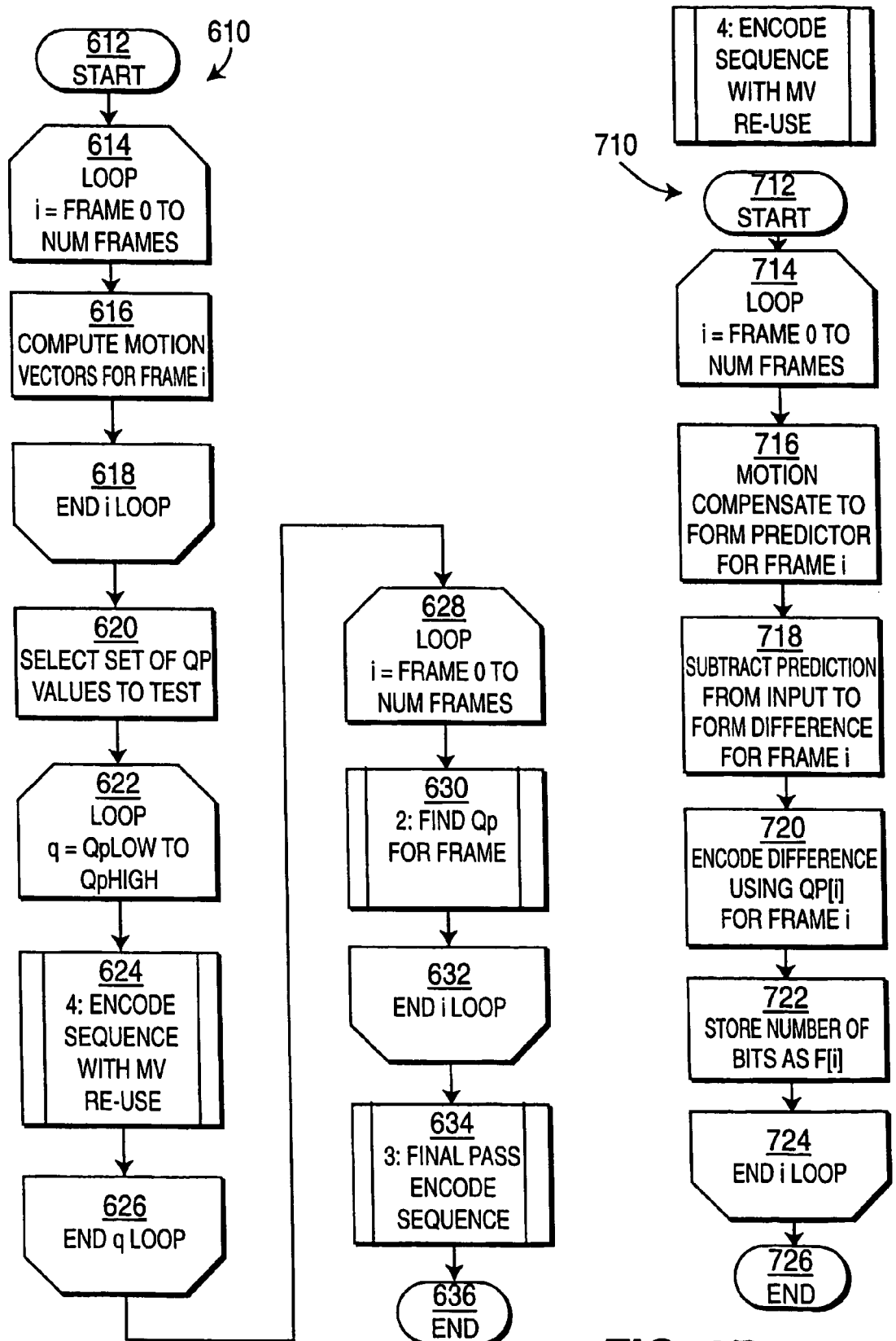

Turning now to FIGS. 2A and 2B, multiple initial passes are shown, one with unique motion estimation ("ME") for each, one with shared ME for each, followed by a decision process and a final pass. FIG. 2A shows a version of the encoder where motion vectors ("MV") are computed for each QP encoding. FIG. 2B shows another version where MV values are re-used for all of the QP passes.

In FIG. 2A, an exemplary process for encoding video signal data for an image block with unique motion estimation ("ME") for each of multiple initial passes is indicated generally by the reference numeral 210. The process 210 includes a start block 212 that leads to a function block 214. The function block 214 selects a set of QP values to test, and leads to a function block 216. The block 216 begins a loop for incrementing a value "q" from a low limit to a high limit, and leads to a first sub-program block 218 for encoding a sequence with motion vector compensation. The sub-program block 218 is defined as the chart 410. The block 218, in turn, leads to an end of loop block 220. Following the loop 216-220, a block 222 begins a loop for incrementing a value "i" from frame 0 to the number of frames, and leads to a second sub-program block 224 for encoding a sequence with motion vector compensation. The sub-program block 224 is defined, for example, by the pseudo-code of the current disclosure, as defined infra. The block 224, in turn, leads to an end of loop block 226. The block 226 leads to a third sub-program block 228 for a final pass encode sequence, and in turn, to an end block 230.

The chart 410 defines the sub-program block 218 for encoding a sequence with motion vector compensation. A start block 412 leads to a function block 414. The block 414 begins a loop for incrementing a value "i" from frame 0 to the number of frames, and then leads to a function block 416 to compute motion vectors for the frame i. The block 418 leads to a block 420 to subtract the prediction from the input to form a difference for frame i. The block 420, in turn, leads to a function block 422 to encode the difference using the quantization parameter q for frame i. The block 422 leads to a function block 424 to store the number of bits as F[i]. The block 424 leads to an end of loop block 426, and hence to an end block 428.

The chart 510 defines the sub-program block 228 for executing the final pass encode sequence. Here, a start block 512 leads to a function block 514. The block 514 begins a loop for incrementing a loop counting value "i" from frame 0 to the number of frames, and then leads to a function block 516 to compute motion vectors for the frame i. The block 518 leads to a block 520 to subtract the prediction from the input to form a difference for frame i. The block 520, in turn, leads to a function block 522 to encode the difference using the quantization parameter QP[i] for frame i. The block 522 leads to an end of loop block 524, and hence to an end block 526.

Referring to FIG. 2B, an exemplary process for encoding video signal data for an image block with shared motion estimation ("ME") for each of multiple initial passes is indicated generally by the reference numeral 610. Here, a start block 612 leads to a loop counter block 614 for incrementing a loop counter i from frame 0 to the number of frames. The block 614 leads to a function block 616 to compute the motion vectors for frame i, and leads to an end of loop block 618. The block 618 leads to a function block 620 for selecting a set of QP values to test. The block 620 begins a loop for incrementing a value "q" from a low limit to a high limit, and leads to a fourth sub-program block 624 for encoding a sequence with MV re-use. The sub-program block 624 is defined as chart 710. The block 624 leads to an end q loop block 626. The block 626 leads to a loop counter block 628 for incrementing a loop counter i from frame 0 to the number of frames. The block 628 leads to the second sub-program block 630 to find the Qp for the frame. The second sub-program block was previously defined, for example, by the pseudo-code of the current disclosure. The block 630 leads to an end i loop block 632. The block 632, in turn, leads to the third sub-program block 634 to execute a final pass encode sequence, as previously defined by the chart 510. The block 634 leads to an end block 636.

The chart 710 defines the sub-program block 624 for encoding a sequence with motion vector re-use. A start block 712 leads to a loop counter block 714 for incrementing a loop counter i from frame 0 to the number of frames. The block 714 leads to a function block 716 to motion compensate to form a predictor for frame i. The block 716 leads to a function block 718 to subtract the prediction from the input to form a difference for frame i. The block 718, in turn, leads to a block 720 to encode the difference using QP[i] for the frame i. The block 720 leads to a function block 722 to store the number of bits as F[i], and then leads to an end i loop block 724. The block 724 leads to an end block 726.

Figure 3:
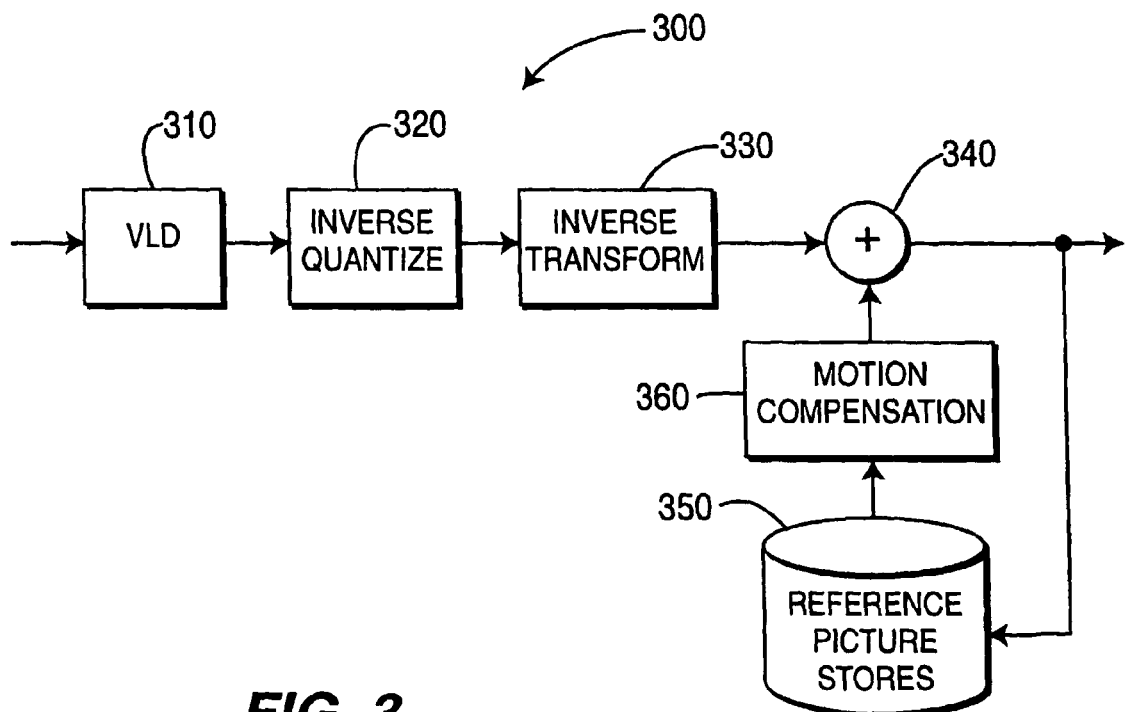
FIG. 3 shows a block diagram for a video decoder with video rate control in accordance with principles of the present invention.

As shown in FIG. 3, a video decoder is indicated generally by the reference numeral 300. The video decoder 300 includes a variable length decoder ("VLD") 310 connected in signal communication with an inverse quantizer 320. The inverse quantizer 320 is connected in signal communication with an inverse transformer 330. The inverse transformer 330 is connected in signal communication with a first input terminal of an adder or summing junction 340, where the output of the summing junction 340 provides the output of the video decoder 300. The output of the summing junction 340 is connected in signal communication with a reference picture store 350. The reference picture store 350 is connected in signal communication with a motion compensator 360, which is connected in signal communication with a second input terminal of the summing junction 340.

In operation, embodiments of the present invention provide a method of performing video rate control for pre-stored video content by using multi-pass encoding techniques to meet the restrictions of a network traffic model. A video encoder performs rate control on pre-stored video content to achieve the best quality video while meeting a network sliding time window constant bitrate constraint. In a pre-encoding step, the video sequence is independently encoded using several different quantization parameter ("QP") values. Next, in a quantization parameter selection process, encoded frame rate counts gathered during the pre-encoding step are used to select QP values for each frame, which are estimated to not exceed the network bandwidth constraint over either leading or lagging time windows. Then a final pass encoding is performed using the selected QP values.

Even in so-called fixed bandwidth packet networks, traffic can be accepted that is somewhat bursty as long as the burstiness of the traffic does not exceed the restrictions of the network traffic model. Constant Bit Rate ("CBR") video does not require that each compressed video frame be encoded using the same number of bits.

Video rate control is feasible for CBR video. Using standards like MPEG and MPEG-2 video that include different frame types, such as I, P and B frames, rate control has generally involved initially finding a target frame rate for each frame, based on the frame type. See, e.g., W. Ding and B. Liu, "*Rate control of MPEG video coding and recording by rate-quantization modeling*", IEEE Transactions on Circuits and Systems for Video Technology, vol. 6, no. 1, pp. 12-20, February 1996. The target frame rate may be chosen for an entire sequence, or for a Group of Pictures ("GOP"), as known in the art. The frame rate target may also depend on the current buffer fullness level. Once a target frame rate is determined for a given frame, a quantization parameter ("QP") is chosen that is predicted to encode the frame at approximately the target frame rate. In the MPEG-4 Verification Model, a spatial complexity measure is computed for the frame and compared to a model that is updated for each coded frame to estimate a QP that yields the target frame rate.

Spatial complexity measures have a correlation with the bitrate required to encode the frame for a given QP. However, because of advanced video encoding techniques, such as, for example, advanced intra prediction in MPEG-4, H.263 and H.26L video standards, it is difficult to form a complexity measure that accounts for the coding techniques, thereby reducing the correlation between the complexity measure and the number of bits required to encode a frame. This, in turn, reduces the accuracy of rate control.

Multipass encoding can be used to achieve more accurate rate control, with an increase in computational complexity. Here, a target bitrate is chosen for a given frame. The frame is encoded using some QP value. The resulting number of bits is compared to the target and the QP value is adjusted based on the difference. The frame is re-encoded using the adjusted QP value until the resulting number of encoded bits is close enough to the target.

Rate control techniques that set bitrate targets for individual frames, rather than for larger frame ranges, yield lower perceived video quality because frames with high complexity must be coded with low QP values to meet the target rate, which leads to poor visual quality for those frames.

Statistical multiplexing is a technique in which multiple and different video sequences share a single fixed rate bandwidth channel, allowing more variation in instantaneous individual sequence bandwidths. This is useful for broadcast applications, such as sending multiple television programs over a shared satellite channel.

In preferred embodiments of the present invention, a video encoder encodes pre-stored video sequences. A video server streams the compressed bitstreams over a packet network. A video decoder receives, decodes and plays the video sequence.

The packet network has a fixed rate bandwidth. It can accept data at variable rates, so long as the constrained fixed rate bandwidth is not exceeded over a predetermined sliding time window. The routers in the packet network contain buffers to shape the network traffic. If the offered traffic load to the network from the video encoder/server exceeds the fixed rate bandwidth over the time window, the router's buffer may overflow and some data may be discarded.

In embodiments of the present invention, the video encoder's rate control meets the network's bandwidth constraint over the predetermined time window. The encoder attempts to maintain constant quality over the time window, and to achieve as little variation in quality throughout the entire video sequence as possible.

Thus, in a pre-encoding step, the video sequence is encoded independently several different times for a set of different QP values. Motion estimation can either be done in advance with the same motion vectors used in all cases, or motion estimation can be done for each separate encoding. The several encodings can be done either sequentially on the same processor, or in parallel by distributing each separate encoding run to a separate processor. The number of bits used to encode each frame for each QP run is recorded.

After the pre-encoding step is performed for each QP, the video encoder performs a quantizer parameter selection process in which it uses the recorded values from the pre-encoding step to select the best QP value for each frame to maximize video quality and minimize video quality variation while meeting the network bandwidth constraint over each time window. For the final encoding, the QP value may vary for each individual frame, while in the pre-encoding step a single QP was used for each entire sequence for a given encoding run. In these embodiments, the number of bits used to encode a frame during a single QP encoding run is used as an estimate of the number of bits to encode for that frame at that QP in the final encoding, regardless of the QP selected for the previous frames in the sequence. In operation, the actual number of bits will vary slightly if different QP values are used.

For example, a sequence is pre-encoded using QP values of 18, 19, and 20. In the QP selection step, $QP_0=18$ was selected for frame 0, and $QP_1=19$ was selected for frame 1. During the selection process for frame 2, it is estimated that the number of bits to encode frame 2 with $QP_2=20$ is equal to the number of bits used to code frame 2 in the pre-encoding run with a QP of 20. In the pre-encoding step for the QP 20 encoding run, frames 0 and 1 were also encoded with $QP_0=QP_1=20$. The actual pixels in frames 0 and 1 that are used to predict frame 2 in the final encoding step differ from the pixels in the QP=20 pre-encoding step run. So, the actual number of bits to encode for frame 2 with QP2=20 in the final encoding may vary slightly from the number found to have been used in the QP=20 pre-encoding step run.

The time window corresponds to N video frames. For example, for a 3 second time window and 30 fps video, N is 90 frames. The maximum bitrate over a time window is T, which could be 3 Mbits for a 1 Mbps channel and a 3 second window, for example.

For each frame in the sequence, the encoder considers N−1 frames ahead in the sequence, the current frame, and N−1 frames behind. The encoder keeps count of the number of bits used to encode the previous N−1 frames, $W_B'$, using estimates from the pre-encoding step runs for the selected QPs, or using the actual resulting frame sizes from the frames that have already been encoded with QPs that have already been selected using this process. The encoder estimates the count of the number of bits, $W_N$, to encode the next N frames, including the current frame, starting with the lowest QP, and chooses the QP for which $W_N$ comes closest to, but does not exceed, the target rate T, and also does not exceed T for the previous N, including the current frame. When considering the previous frames, all previous frames' QP values have already been selected and those values are used, and the current frame uses the current QP value under consideration. This process is repeated for each frame in the sequence. This process is described in the pseudo code listed below. For the beginning and end of the sequence, when N frames are not available before or after the current frame, only those frames that are present in the sequence are considered in the calculations.

---

F[ ] = Array of sizes of frames in bits already selected for output
$S_x$[ ] = Arrays of sizes of frames in bits for reference sequence with QP of X for i = 0:<number of frames>
    $W_B'$ = sum (F[i − N]:F[i − 1])
    for q = $QP_{LOW}$: $OP_{HI}$
        $W_N$ = sum ($S_q$[i] : $S_q$[i + N − 1])
        $W_B$ = $W_B'$ + $S_q$[i]
        if ($W_N$ < T) and ($W_B$ < T)
            QP[i] = q
            F[i] = $S_q$[i]
            Goto next frame

---

After a QP has been selected for each frame, using the preceding steps, a final encoding pass is run. In the final pass, the selected QP is used for each frame. Optionally, motion estimation can be re-computed during this run, or the previously computed motion vectors can be used. Re-computing motion estimation allows more accurate rate-distortion optimization to be performed in the motion vector estimates and mode selection.

Because the estimation model is not exact, an additional step can be added after the final encoding pass, which confirms that the actual number of bits generated during each N frames does not exceed T. If the current frame generates too many bits such that the bits from the current frame plus the N previous frames exceed the target, the frame can be re-encoded with a higher QP value. Alternatively, in another embodiment of the invention, the target window rate, T, can be adjusted to a lower T', where T'<T, prior to the selection process, to reduce the likelihood that the rate control estimation error will not exceed T−T'.

To reduce the amount of computations, the pre-encoding step does not need to be performed for all possible QP values. Instead a subset of the possible QP values could be used in the pre-encoding step. Then values can be estimated for each frame's bit count for the unused intermediate QP values by using linear interpolation or curve fitting between the used subset. For example, if QP values of 18 and 20 are used in the pre-encoding step, bit counts for each frame for a QP of 19 can be estimated by averaging the bit counts correspond to QP 18 and QP 20. The range of QP values to perform the pre-encoding step on can be limited using some type of complexity measure and the channel bitrate.

The pseudo-code is merely exemplary. For each of the initial passes, it is not required that all pictures of different picture types have the same quantization parameter ("QP"), but only that all pictures of the same picture type have the same QP. Thus, alternate procedures may encode a sequence with a QPI for I frames, a different QPP for P frames, and a different QPB for B frames.

It will be understood by those of ordinary skill in the pertinent art that the teachings of the present invention may be applied to pictures or fields, as well as to video frames. Alternate embodiments of the present invention can be used with many different video compression standards that have adjustable quantization parameters, such as, for example, H.261, H.263, H.26L, MPEG-1, MPEG-2, and MPEG-4.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may either be part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which embodiments of the present invention are programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An encoder for encoding a sequence of pictures as a plurality of block transform coefficients to meet network traffic model restrictions, the encoder comprising an iterative loop for selecting one of a plurality of quantization parameter values for each picture, said iterative loop comprising:
    pre-encoding for pre-encoding the sequence of pictures for each of a plurality of quantization parameter values;
    selecting means for selecting for each picture of the sequence one of the plurality of quantization parameter values responsive to the quantization parameter values and bitrate operating points of the neighboring pictures in a predetermined time window; and
    encoding means for encoding each picture of the sequence using the quantization parameter value selected for that picture.

2. An encoder as defined in claim 1, wherein the quantization parameter value selected for the time window encodes a window's worth of pictures at about a target picture rate.

3. An encoder as defined in claim 1, wherein the quantization parameter value selected for the time window encodes a window's worth of pictures at about a target bitrate.

4. An encoder as defined in claim 1, wherein the quantization parameter values selected for each picture in the video sequence and for the neighboring pictures in the same time window as the given picture are chosen to encode the pictures to be transmitted within a time window of preset duration to be encoded within a target number of bits.

5. An encoder as defined in claim 1, wherein the sequence of video pictures comprises a group of pictures.

6. An encoder as defined in claim 1, wherein the sequence of video pictures comprises pre-stored video content.

7. An encoder as defined in claim 1, wherein a portion of sequence of video pictures to be transmitted within a preset time duration meets a network traffic model restricting the number of bits to be transmitted within the preset time duration.

8. An encoder as defined in claim 1, wherein the selecting means for selecting one of the plurality of quantization parameter values for each picture of the video sequence comprises multi-pass encoding means to optimize the quantization parameter value selected to encode each picture.

9. An encoder as defined in claim 1, wherein the pre-encoding means for pre-encoding the sequence of pictures for each of the plurality of quantization parameter values comprises means for re-using motion vector values.

10. An encoder as defined in claim 1 in combination with a decoder for decoding encoded block transform coefficients that meet network traffic model restrictions to provide reconstructed pixel data, the decoder comprising a variable length decoder for decoding video data corresponding to the time window having a preset duration according to a network traffic model.

11. A codec comprising an encoder as defined in claim 1, and a decoder for decoding encoded block transform coefficients that meet network traffic model restrictions to provide reconstructed pixel data, the decoder comprising a variable length decoder for decoding video data corresponding to a decoder time window having a preset duration according to the network traffic model.

12. A computer program product comprising a computer useable medium having computer readable program code embodied thereon for use in a video encoder, the computer program product comprising:
    program code for pre-encoding the sequence of pictures for each of a plurality of quantization parameter values;
    program code for selecting for each picture of the sequence one of the plurality of quantization parameter values responsive to the quantization parameter values and bitrate operating points of the neighboring pictures in the sliding time window; and
    program code for encoding each picture of the sequence using the quantization parameter value selected for that picture.

13. A method of performing video rate control on a sequence of pictures to meet network traffic model restrictions, the method comprising:
    pre-encoding the sequence of pictures for each of a plurality of quantization parameter values;
    selecting for each picture of the sequence one of the plurality of quantization parameter values responsive to the quantization parameter values and bitrate operating points of the neighboring pictures in a predetermined time window; and
    encoding each picture of the sequence using the quantization parameter value selected for that picture.

14. A method as defined in claim 13 wherein the sequence of pictures comprises a sequence of video frames.

15. A method as defined in claim 13 wherein the quantization parameter value selected for a predetermined time window encodes a window's worth of pictures at about a target bitrate.

16. A method as defined in claim 13 wherein the quantization parameter values selected for each picture in the video sequence and for the neighboring pictures in the same predetermined time window as the given picture are chosen to encode the pictures to be transmitted within a time window of preset duration to be encoded within a target number of bits.

17. A method as defined in claim 13 wherein the sequence of video pictures comprises a group of pictures.

18. A method as defined in claim 13 wherein the sequence of video pictures comprises pre-stored video content.

19. A method as defined in claim 13 wherein a portion of the sequence of video pictures to be transmitted within a preset time duration meets a network traffic model restricting the number of bits to be transmitted within the preset time duration.

20. A method as defined in claim 13 wherein selecting one of the plurality of quantization parameter values for each picture of the video sequence comprises using multi-pass encoding techniques to optimize the quantization parameter value selected to encode each picture.

21. A method as defined in claim 13 wherein pre-encoding the sequence of pictures for each of the plurality of quantization parameter values comprises re-using motion vector values.

* * * * *